US006601185B1

(12) United States Patent
Bass et al.

(10) Patent No.: US 6,601,185 B1
(45) Date of Patent: Jul. 29, 2003

(54) SECONDARY ALARM FILTERING

(75) Inventors: Neil Rounce Bass, Dursley (GB);
Graham John Davies, Avening (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/542,352

(22) Filed: Apr. 4, 2000

(30) Foreign Application Priority Data

Apr. 7, 1999 (EP) ............................................. 99302696

(51) Int. Cl.⁷ ................................................ G06F 11/00
(52) U.S. Cl. ............................................. 714/4; 714/25
(58) Field of Search ................................. 714/4, 48, 25

(56) References Cited

U.S. PATENT DOCUMENTS

| 5,260,945 A | * | 11/1993 | Rodeheffer | 714/4 |
| 5,309,448 A | * | 5/1994 | Bouloutas et al. | 714/25 |
| 5,768,501 A | | 6/1998 | Lewis | 395/185.01 |
| 5,778,184 A | * | 7/1998 | Brownmiller et al. | 709/224 |
| 5,991,264 A | * | 11/1999 | Croslin | 370/225 |
| 6,237,034 B1 | * | 5/2001 | Fulford | 356/400 |
| 6,263,455 B1 | * | 7/2001 | Bannister | 714/25 |
| 6,373,383 B1 | * | 4/2002 | Arrowsmith et al. | 340/506 |

FOREIGN PATENT DOCUMENTS

| EP | 0739111 A2 | 4/1996 | ........... H04L/12/26 |

* cited by examiner

*Primary Examiner*—Robert Beausoliel
*Assistant Examiner*—Christopher McCarthy

(57) ABSTRACT

A sub-network manager in a telecommunications network such as a synchronous digital hierarchy (SDH) or a synchronous optical network (SONET) filters out secondary (AIS) alarms generated in response to signals received by network elements on incoming links by determining whether the upstream termination point of the incoming link on which the signal was received is within the managed domain of the sub-network manager. If it is within the managed domain, the alarm is blocked. If the upstream termination point is outside the managed domain the alarm is processed further. In the latter case the secondary alarm may be the only indication of the fault causing the alarm that the sub-network manager receives, whereas in the former case it will have received notification from some other alarm, either a primary alarm, such as a loss of signal alarm (LOS) or an AIS alarm generated in response to a signal entering the managed domain from outside.

8 Claims, 2 Drawing Sheets

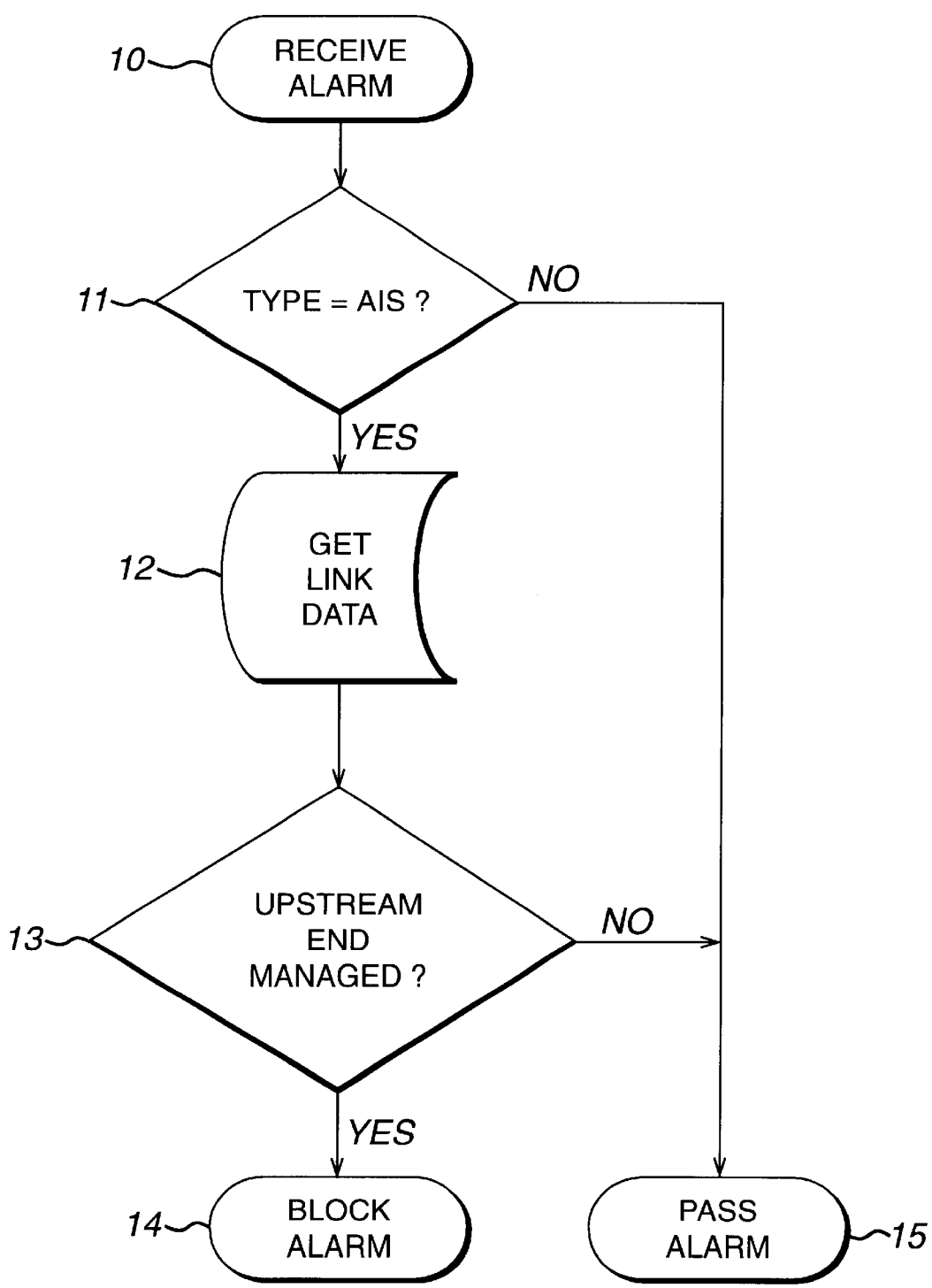

SECONDARY ALARM FILTERING

CROSS-REFERENCE TO RELATED APPLICATION

This application claims priority of European Patent Application No. 99302696.2, which was filed on Apr. 07, 1999.

TECHNICAL FIELD

This invention relates to methods of filtering alarm indication signals (AIS) in communications systems such as Synchronous Digital Hierarchy (SDH) and Synchronous Optical Network (SONET) systems.

BACKGROUND OF THE INVENTION

When a fault is discovered in a communications systems such as SDH (synchronous digital hierarchy) or SONET (synchronous optical network) an alarm is generated from the network element detecting the fault, identifying the network element as the source of the alarm, so that the system can be reconfigured to avoid routing signals through the affected link and/or network element, and so that action can be taken to restore normal communication. For example, a network element may detect a loss of signal on a link and generate a LOS (loss of signal) alarm. The alarm is passed up to the network element manager.

Since such systems include virtual connections which pass through several physical links (known as a "layer hierarchy"), it is also necessary to generate secondary alarms (alarm indication signal (AIS) alarms) from the network elements downstream of the fault. Thus, the network element that detects the loss of signal sends a characteristic signal (an AIS signal), which consists of a recognisable pattern, such as a series of '1' bits, along its downstream link to inform downstream network elements that a loss of signal has been detected. The network elements that receive such an AIS signal generate AIS alarms which are sent up to the element manager. The network element manager sends the alarms on up to the sub-network manager. The generation of these secondary alarm signals means that a single fault can result in a great many secondary alarm signals.

An analogy is with a railway network, in which many routes pass through any one section of track, and each route also passes through many sections of track. Therefore, if one section of track is damaged, this affects many stations along the various routes. One damaged section of track will therefore give rise to announcements in many stations.

Whilst these secondary (AIS) alarms perform an essential function, they also give rise to a problem, in that, from the point of view of the sub-network manager, there are too many alarms raised as a result of a single fault. The sub-network manager needs to report and keep account of faults and to maintain a map of the system configuration, but it is not involved in routing particular messages through the system, so the fewer signals that correspond to a single fault the better; one signal per fault would be ideal. However, the element managers only deal with the network elements as individual elements, and do not have the high-level information to distinguish between signals that the sub-network manager needs and those which it does not need, so they have to send them all to the sub-network manager. It is not enough simply to send primary, root cause, alarms, such as LOS alarms, and to withhold secondary (AIS) alarms, since the source of the primary signal may not be in the sub-network manager's domain, although the fault affects the operation of the sub-network manager's domain (i.e. the portion of the network that it controls).

Therefore a method is required which distinguishes between the secondary (AIS) alarms that the sub-network manager needs and those that it does not need.

SUMMARY OF THE INVENTION

According to the principles of the invention there is provided a method of filtering secondary alarm signals sent to a sub-network manager of a telecommunications network wherein the sub-network manager is arranged to manage network elements in a respective managed domain. More specifically, the method comprises determining whether the alarm is a secondary (AIS) alarm generated in response to a signal received by a network element on an incoming link. If the alarm is not a secondary alarm, the alarm is passed for further processing. If the alarm is a secondary alarm, a search for the upstream termination point of the incoming link is carried out to determine whether the upstream termination point is in the managed domain of the sub-network manager. If the upstream termination point is in the managed domain, the alarm is blocked. If not in the managed domain, the alarm is passed for further processing.

Accordingly, since the sub-network manager has information on the connectivity of the network domain, it can determine whether the network element that originates the alarm is on the edge of the managed domain. If the upstream link is terminated by a termination point which is not in the managed domain, the alarm is passed. If it is terminated by a termination point which is in the managed domain the alarm is blocked. Thus, the only secondary alarms that are passed are those that are generated as a response to a signal entering the domain from outside.

BRIEF DESCRIPTION OF THE DRAWINGS

FIG. 2 is a flow diagram, showing how the sub-network manager of FIG. 1 filters AIS alarms.

DETAILED DESCRIPTION

Figure 1:
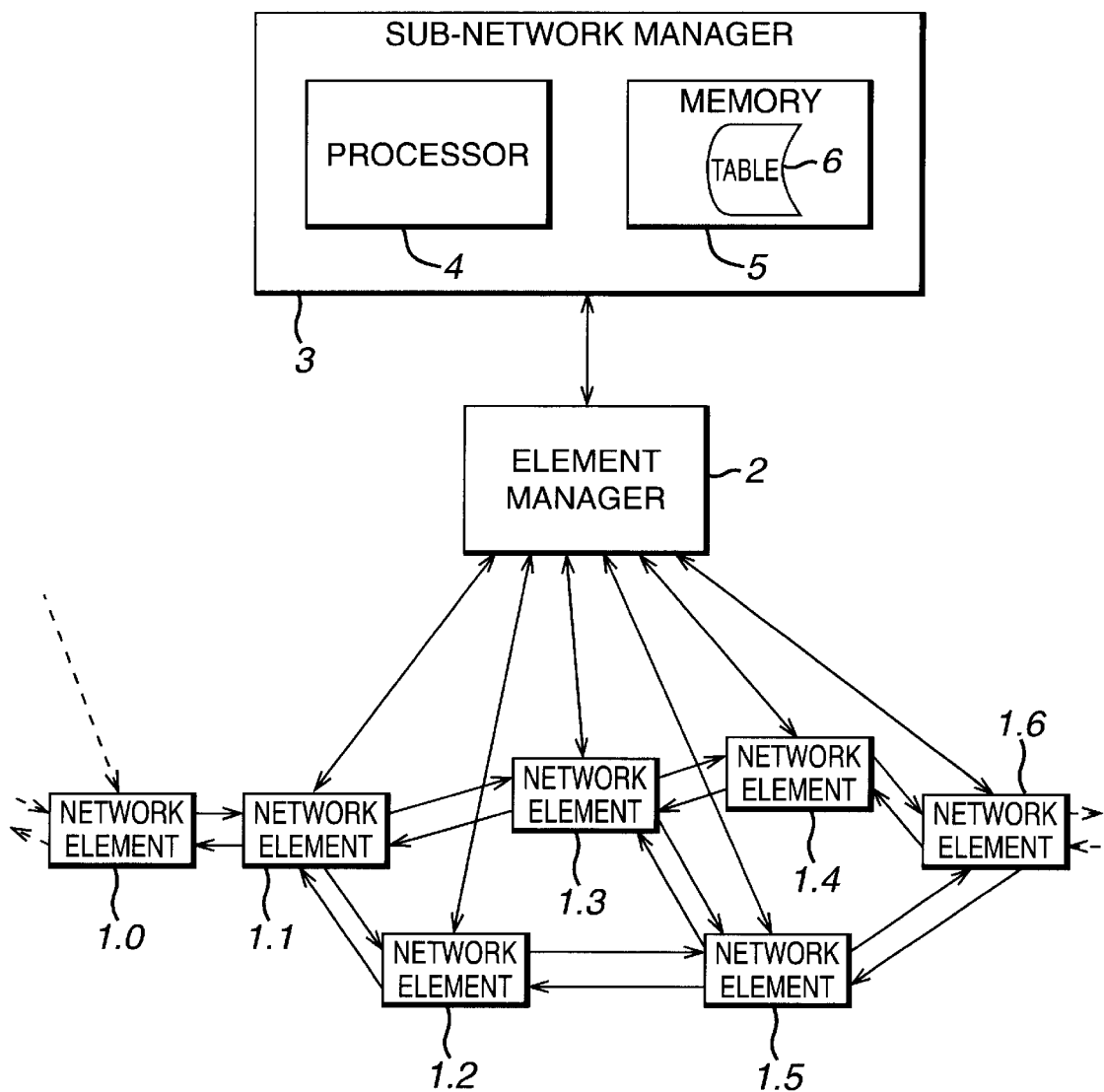
FIG. 1 shows, in simple diagrammatic form, a sub-network in which the invention could be implemented.

FIG. 1 shows a number of network elements, 1.0–1.6, connected to form part of a telecommunications network such as a SDH or SONET type of network. The network elements each contain all the functionality required to route incoming signals, but they do not have any information on the topology of the network, so they have to rely on higher levels of control to configure them so that they route the signals to the correct downstream elements.

The network elements 1.1–1.6 are controlled and monitored by an element manager 2 which deals with the network elements as individual units. That is to say, it does not have information on the network topology, but it does have information on the individual network elements—what type of equipment they contain and what exchanges of signals are necessary to reconfigure them. Although only six network elements are shown connected to the element manager 2, in a typical network there might be of the order of two hundred network elements controlled by one element manager.

The connecting links between the network elements may comprise optical fibre links which may carry of the order of 16×63=1008 channels. Many of these channels will be configured as part of virtual connections. A virtual connection is a semipermanent arrangement of channels configured to provide a connection between end-points which are not directly connected by the network. In fact, the end points of a virtual connection may be in different parts of the network, managed by different sub-network managers.

The element manager is connected to a sub-network manager 3 which controls the section of the network in its domain as a set of links forming end-to-end connections. To do this, it needs to have information on the topology of the part of the network in its domain and to maintain a map of which links or network elements are non-operative, so that it can reconfigure the network to avoid them while maintaining the required end-to-end connections. Therefore, it needs to receive alarms that are raised by the network elements indicating non-functionality of some part of the network.

Although FIG. 1 shows only one element manager 2 connected to the sub-network manager 3, it is presently contemplated that up to about ten element managers may be connected to a single sub-network manager, so a single sub-network manager may have somewhere of the order of 200 to 2000 network elements in its management domain.

The sub-network manager 3 includes a processor 4 and a memory 5 arranged to carry out its functionality including the filtering method of the invention. Included in the memory 5 is a table 6 which includes information about the links connected to the network elements 1.1–1.6 in the managed domain.

The sub-network manager is in turn connected to a higher-level manager (not shown), culminating in a manager for the whole network.

If the link running from network element 1.1 to network element 1.3 is damaged and becomes non-functional, the downstream network element 1.3 detects a loss of signal and sends a LOS alarm up to the element manager 2. Since alarms such as this affect the links that are available to the network, the element manager 2 passes them up to the sub-network manager 3, which needs to maintain its map of functional and non-functional links. Since the affected link may be part of many virtual connections, other network elements than 1.3 are affected by the damage to the link, and the network element 1.3 generates an AIS signal (e.g. a string of '1' digits or some other recognisable signal) and sends it out on the downstream links. The downstream network elements that receive the AIS signal send an AIS alarm to their element manager, which may not be the same as the element manager 2 of the element 1.3 that sent the LOS alarm. The element manager passes the AIS alarm to the sub-network manager, which may not be the same sub-network manager 3 as the one that received the original LOS alarm.

The alarms contain information identifying what type of alarm they are (e.g. LOS or AIS) and which termination point generated the alarm. Thus, in the case of the original LOS alarm, the alarm will identify itself as a LOS alarm and identify the termination point of the link from element 1.1 to element 1.3. This will provide information that the sub-network manager 3 needs to maintain its map, namely that the particular link that is identified has become non-functional. Once the sub-network manager 3 has received this information, it has all it needs to deal with the problem. The AIS alarms generated by the downstream elements do not provide anything new. On the other hand, it may be that an AIS alarm is the first or only indication of a problem occurring upstream, outside the domain of the sub-network manager 3. Since the element manager cannot determine whether or not this is the case, it has to pass all AIS alarms up, with the result that the sub-network manager will receive many, possibly a great many, AIS alarms every time a problem arises in its domain, or, in some cases, outside it.

FIG. 2 shows the method carried out by the processor 4 by which the sub-network manager filters incoming alarms so as to eliminate irrelevant AIS alarms.

When an alarm is received 10 it is examined to determine whether it is an AIS alarm 11. If it is not, then the alarm is passed 15, since it may contain relevant information. If the alarm is an AIS alarm it is examined to determine which termination point raised the alarm, and the table of links 6 held by the sub-network manager is searched 12 for the upstream termination point of that link to determine whether it is in the managed domain of the sub-network manager 13. If it is not in the managed domain (for example, the upstream termination point is not in the table and the search 12 fails), the alarm is passed 15, whereas if it is in the managed domain the alarm is blocked 14.

In the case we have been considering, the damaged link is that running from element 1.1 to element 1.3. Element 1.3 raises a LOS alarm which is passed up to the sub-network manager 3. This LOS alarm identifies itself as a LOS alarm and identifies the termination point that detected the loss of signal, i.e. the termination of the link from element 1.1 to 1.3. It also sends an AIS signal downstream. When a downstream element, say 1.4, detects the AIS, it generates an AIS alarm, which is also sent up to the sub-network manager 3. The AIS alarm identifies itself as an AIS alarm and identifies the termination point which received the AIS signal.

When the sub-network manager 3 receives the LOS alarm, the alarm is passed 15, since it is not an AIS alarm, and the sub-network manager processes it further, using the information contained in it to identify the problem that caused it.

When the sub-network manager 3 receives the AIS alarm from element 1.4 the processor 4 identifies it as an AIS alarm 11, determines 12 that it relates to the link from element 1.3 to 1.4 and looks up that link in its table 6. Thus it determines 13 that the upstream link termination point 1.3 is in the managed domain, so it blocks the alarm 14 and does not process it any further. Since it was caused by same problem as the LOS alarm, the AIS alarm would not have provided any additional information.

On the other hand, if a network element, such as element 1.0, which is not in the managed domain of sub-network manager 3, detects a loss of signal or an AIS signal on a link other that that from element 1.1, it will send an AIS signal downstream to network element 1.1, which generates an AIS alarm identifying itself as an AIS alarm and identifying the termination point which received the AIS signal.

When the sub-network manager 3 receives this AIS signal and the processor 4 comes to look up the link data in the table 6, it finds that the upstream link termination point 1.0 is outside the managed domain and therefore passes the alarm. In this case, the alarm was caused by a problem occurring outside the managed domain, so the sub-network manager 3 will not have been informed of the problem, though it affects the operation of the managed domain. Therefore the processor needs to process the alarm further.

Element 1.1 also sends an AIS signal downstream to element 1.3, which also generates an AIS alarm, but this time, the processor 4, when it looks up the link data, finds that the upstream termination point 1.1 is in the managed domain, so it blocks the alarm and does not process it further. The alarm does not contain any information not already contained in the AIS alarm from element 1.1, so it is not necessary for the processor to process it further.

Thus, the method illustrated in FIG. 2 effectively frees the sub-network manager from being overloaded with information which is not relevant to it. It does this merely by looking up the link data for the alarm, so the filtering process itself does not impose any great computational burden on the sub-network manager.

The foregoing is merely illustrative of the principles of the invention. Those skilled in the art will be able to devise numerous arrangements which, although not explicitly shown or described herein, nevertheless embody those principles that are within the spirit and scope of the invention. Accordingly, the invention is only limited by the claims that follow.

What is claimed is:

1. A method of filtering alarms sent to a sub-network manager of a telecommunications network, the sub-network manager being arranged to manage network elements in a respective managed domain, the method comprising:

determining whether the alarm is a secondary (AIS) alarm, generated in response to a signal received by a network element on an incoming link;

if the alarm is not a secondary alarm, passing the alarm for further processing;

if the alarm is a secondary alarm, searching for the upstream termination point of the incoming link and determining whether the upstream termination point is in the managed domain of the sub-network manager;

if the upstream termination point is in the managed domain, blocking the alarm; and if the upstream termination point is not in the managed domain, passing the alarm for further processing.

2. A method according to claim 1 wherein the method is carried out within the sub-network manager.

3. A method according to claim 2 wherein a secondary (AIS) signal includes data identifying the link termination point that received the signal in response to which the alarm was generated, and the step of searching for the upstream termination point of the incoming link comprises using the data identifying the link termination point to retrieve link data from a table held by the sub-network manager.

4. A method according to claim 1 wherein the network is a synchronous digital hierarchy (SDH) network.

5. A method according to claim 1 wherein the network is a synchronous optical network (SONET).

6. A method of filtering alarms sent to a sub-network manager of a telecommunications network, the said sub-network manager being arranged to manage network elements in a respective managed domain, the method comprising:

determining whether the alarm is a secondary (AIS) alarm, generated in response to a signal received by a network element on an incoming link;

if the alarm is not a secondary alarm, passing the alarm for further processing;

if the alarm is a secondary alarm, searching for the upstream termination point of the said incoming link and determining whether the said upstream termination point is in the managed domain of the sub-network manager;

if the upstream termination point is in the managed domain, blocking the alarm; and if the upstream termination point is not in the managed domain, passing the alarm for further processing;

wherein the network includes at least one virtual connection having a termination point within the managed domain and a termination point not in the managed domain.

7. A sub-network manager for a telecommunications network, the sub-network manager being arranged to manage network elements in a respective managed domain, the sub-network manager comprising:

means for determining whether the alarm is a secondary (AIS) alarm, generated in response to a signal received by a network element on an incoming link;

means for passing the alarm for further processing if the alarm is not a secondary alarm;

means for searching for the upstream termination point of the incoming link and determining whether the upstream termination point is in the managed domain of the sub-network manager if the alarm is a secondary alarm;

means for blocking the alarm if the upstream termination point is in the managed domain; and means for passing the alarm for further processing if the upstream termination point is not in the managed domain.

8. A telecommunications network including a sub-network manager being arranged to manage network elements in a respective managed domain, the sub-network manager comprising:

means for determining whether the alarm is a secondary (AIS) alarm, generated in response to a signal received by a network element on an incoming link;

means for passing the alarm for further processing if the alarm is not a secondary alarm;

means for searching for the upstream termination point of the incoming link and determining whether the upstream termination point is in the managed domain of the sub-network manager if the alarm is a secondary alarm;

means for blocking the alarm if the upstream termination point is in the managed domain; and means for passing the alarm for further processing if the upstream termination point is not in the managed domain.

* * * * *